US010661126B2

(12) United States Patent
Feng et al.

(10) Patent No.: US 10,661,126 B2
(45) Date of Patent: May 26, 2020

(54) BALL STRUCTURE AND METHOD FOR MAKING THE SAME

(71) Applicant: San Fang Chemical Industry Co., Ltd., Kaohsiung (TW)

(72) Inventors: Chung-Chih Feng, Kaohsiung (TW); Chun-Wei Wu, Kaohsiung (TW); Yong-Song Lin, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 16/149,725

(22) Filed: Oct. 2, 2018

(65) Prior Publication Data

US 2019/0160346 A1 May 30, 2019

(30) Foreign Application Priority Data

Nov. 27, 2017 (TW) .............................. 106141087 A

(51) Int. Cl.
*A63B 41/08* (2006.01)
*A63B 41/02* (2006.01)
(Continued)

(52) U.S. Cl.
CPC .............. *A63B 41/08* (2013.01); *A63B 41/02* (2013.01); *A63B 41/10* (2013.01); *A63B 45/00* (2013.01);
(Continued)

(58) Field of Classification Search
CPC ......... A63B 41/08; A63B 41/10; A63B 41/02; A63B 45/00; A63B 2243/0037;
(Continued)

(56) References Cited

U.S. PATENT DOCUMENTS 5,772,545 A * 6/1998 Ou .................... A63B 41/00
156/170
6,099,423 A * 8/2000 Ou .................... A63B 41/08
473/604

(Continued)

FOREIGN PATENT DOCUMENTS

| TW | I247834 B | 1/2006 |
| TW | I259223 | 8/2006 |
| TW | M310720 | 5/2007 |

OTHER PUBLICATIONS

English Abstract of TW I247834B.
(Continued)

*Primary Examiner* — Steven B Wong
(74) *Attorney, Agent, or Firm* — WPAT, P.C., Intellectual Property Attorneys; Anthony King

(57) ABSTRACT

The present invention relates to a ball structure and a method for making the same. The ball structure includes an inner bladder and a plurality of covers. The covers surround the inner bladder. Each of the covers includes a base fabric and a resin layer. The resin layer has a recess portion at the periphery of the cover, so that the recess portions of adjacent covers defines a groove. The base fabric includes a first portion and a second portion. The first portion corresponds to the recess portion, and the second portion is away from the recess portion. The thickness of the first portion is substantially equal to the thickness of the second portion.

4 Claims, 11 Drawing Sheets

(51) Int. Cl.
*A63B 41/10* (2006.01)
*A63B 45/00* (2006.01)
*B32B 37/12* (2006.01)
*B32B 27/12* (2006.01)
*B32B 27/40* (2006.01)
*B32B 3/26* (2006.01)
*B32B 7/12* (2006.01)
*B32B 37/14* (2006.01)
*B32B 37/18* (2006.01)

(52) U.S. Cl.
CPC ............... *B32B 3/263* (2013.01); *B32B 7/12* (2013.01); *B32B 27/12* (2013.01); *B32B 27/40* (2013.01); *B32B 37/12* (2013.01); *B32B 37/144* (2013.01); *B32B 37/182* (2013.01); *A63B 2243/0037* (2013.01)

(58) Field of Classification Search
CPC ........... B32B 7/12; B32B 3/263; B32B 27/40; B32B 27/12; B32B 37/12; B32B 37/144; B32B 37/182
See application file for complete search history.

(56) References Cited

U.S. PATENT DOCUMENTS

| | | | | |
|---|---|---|---|---|
| 6,406,389 B1* | 6/2002 | Feeney | ................. | A63B 41/08 473/596 |
| 6,422,961 B1* | 7/2002 | Feeney | ................. | A63B 41/08 473/596 |
| 7,759,423 B2* | 7/2010 | Chauk | ................. | C08F 283/06 252/182.24 |
| 8,821,983 B2* | 9/2014 | Erdem | ................. | C08G 18/12 427/385.5 |
| 2002/0086749 A1* | 7/2002 | Ou | ................. | A63B 41/00 473/604 |
| 2005/0153803 A1* | 7/2005 | Swiszcz | ................. | A63B 41/08 473/593 |
| 2006/0046880 A1* | 3/2006 | Tang | ................. | A63B 41/08 473/604 |
| 2006/0084536 A1* | 4/2006 | Taniguchi | ............. | A63B 41/00 473/605 |
| 2007/0037642 A1* | 2/2007 | Chang | ................. | A63B 41/08 473/604 |
| 2007/0219028 A1 | 9/2007 | Fujisawa et al. | | |
| 2008/0051234 A1* | 2/2008 | Nagao | ................. | A63B 39/06 473/604 |
| 2009/0186724 A1* | 7/2009 | Ashida | ................. | A63B 41/08 473/607 |
| 2012/0088614 A1* | 4/2012 | Bulfin | ................. | A63B 41/08 473/604 |
| 2012/0142465 A1* | 6/2012 | Berggren | ............... | A63B 41/08 473/604 |
| 2013/0005521 A1* | 1/2013 | White | ................. | A63B 41/085 473/604 |
| 2013/0059683 A1* | 3/2013 | Krysiak | ................. | A63B 41/02 473/597 |
| 2014/0179469 A1* | 6/2014 | Berggren | ............... | A63B 45/00 473/604 |
| 2017/0072270 A1* | 3/2017 | Shishido | ................. | A63B 41/08 |
| 2018/0296881 A1* | 10/2018 | Masood | ................. | A63B 41/08 |

OTHER PUBLICATIONS

English abstract of TW I259223.
English abstract of TW M310720.
Office Action dated May 30, 2018 and Search Report dated May 18, 2018 issued by Taiwan Intellectual Property Office for TW counterpart application No. 106141087.
English Translation of Search Report dated May 18, 2018 issued by Taiwan Intellectual Property Office for TW counterpart application No. 106141087.

* cited by examiner

BALL STRUCTURE AND METHOD FOR MAKING THE SAME

BACKGROUND OF THE INVENTION

1. Field of the Invention

The present invention relates to a ball structure and method for making the same, and more particularly to a ball structure having covers without chamfered corners, and a method for making the same.

2. Description of the Related Art

Referring to FIG. 1, FIG. 1 illustrates a schematic perspective view of a conventional basketball 9. Referring to FIG. 2, FIG. 2 illustrates a schematic partially cross-sectional view of the conventional basketball 9 of FIG. 1. The conventional basketball 9 includes an inner bladder 90, a winding layer 92, a middle bladder 94 and a plurality of covers 96. The inner bladder 90 may be inflated to form a ball shape structure, and the material of the inner bladder 90 is generally rubber. The winding layer 92 coats or covers the inner bladder 90. The winding layer 92 includes a plurality of yarns (or threads) that are wound on the outer surface of the inner bladder 90 to wrap the inner bladder 90 and fix the shape of the inner bladder 90, so as to prevent the inner bladder 90 from being deformed. The material of the winding layer 92 is generally nylon. The middle bladder 94 coats or covers the winding layer 92, and includes a plurality of protrusion portions 941 to define a plurality of accommodating areas 942. The material of the middle bladder 94 is generally rubber. Materials of the covers 96 are generally rubber or synthetic leather (or artificial leather), and there are generally eight pieces or sixteen pieces of covers 96. The covers 96 are attached or adhered to the middle bladder 94 in the accommodating areas 942. Adjacent two covers 96 and the protrusion portion 941 therebetween define a groove (or a seam, or a channel) 91. The groove 91 can increase the friction force between the user's palm and the conventional basketball 9 so as to increase maneuverability or controllability.

Referring to FIG. 3, FIG. 3 illustrates a schematic view of a method for making a conventional basketball 9. The method for making the conventional basketball 9 is described as follows. First, the inner bladder 90 is provided. Next, the plurality of yarns (or threads) are wound on the outer surface of the inner bladder 90 to form the winding layer 92. Next, after the inner bladder 90 and the winding layer 92 are placed in a mold (not shown), the middle bladder 94 is formed on the outer surface of the winding layer 92. The middle bladder 94 includes a plurality of protrusion portions 941 to define a plurality of accommodating areas 942. Next, the covers 96 are provided. Each of the covers 96 has a first surface 961, a second surface 962, a peripheral edge 963 and a corner portion 964. A size of each of the covers 96 is substantially equal to a size of the corresponding accommodating areas 942. The corner portion 964 is disposed on the second surface 962 near the peripheral edge 963. Next, the corner portion 964 is removed by blade or in another way. The processing stage is referred to as "chamfering" (or "edge cutting", or "edge peeling"). Next, the second surfaces 962 of the covers 96 are attached or adhered to the middle bladder 94 in the accommodating areas 942. Next, the covers 96 are pressurized so that the first surfaces 961 of adjacent two covers 96 that are near the protrusion portion 941 are recessed. Thus, adjacent two covers 96 and the protrusion portion 941 therebetween define a groove (or a seam, or a channel) 91, as shown in FIG. 1.

The method for making the conventional basketball 9 has disadvantages such as a long processing time, high labor costs, relatively low production efficiency, and poor product stability. In addition, the processing stage of "chamfering" (or "edge cutting", or "edge peeling") not only increases processing time and cost but also needs to conduct a treatment of the waste (i.e., the corner portion 964).

Therefore, it is necessary to provide an innovative and progressive ball structure and a method for making the same, to resolve the foregoing problems.

SUMMARY OF THE INVENTION

The present invention provides a ball structure, which includes an inner bladder and a plurality of covers. The covers surround the inner bladder. Each of the covers comprises a base fabric layer and a resin layer. The resin layer has a recess portion at a peripheral edge of the cover, and the recess portions of adjacent covers define a groove. The base fabric layer has a first portion and a second portion. The first portion corresponds to the recess portion. The second portion is far away from the recess portion. A thickness of the first portion is substantially equal to a thickness of the second portion.

The present invention further provides a method for making a ball structure, comprising: (a) providing an inner bladder, a winding layer and a middle bladder, wherein the winding layer covers the inner bladder, the middle bladder covers the winding layer and includes a plurality of protrusion portions to define a plurality of accommodating areas; (b) providing a plurality of covers, wherein each of the covers comprises a base fabric layer and a resin layer, and the resin layer has a recess portion at a peripheral edge of the cover; and (c) attaching the base fabric layers of the covers to the middle bladder in the accommodating areas so that the recess portions of adjacent covers and the protrusion portion therebetween define a groove.

The present invention further provides a method for making a ball structure, comprising: (a) providing a plurality of covers, wherein each of the covers includes a base fabric layer and a resin layer, the resin layer has a recess portion at a peripheral edge of the cover, and the resin layer has a first surface that is far away from the base fabric layer; (b) attaching the first surfaces of the resin layers of adjacent covers to each other at the peripheral edges of the covers to form an outer skin structure; (c) reversing the outer skin structure from the inside to the outside, so that the first surface of the resin layer faces outward, wherein the outer skin structure substantially forms a ball shape structure, and includes a notch; (d) placing an inner bladder in the outer skin structure through the notch; and (e) attaching at least one cover to the inner bladder that is exposed by the notch.

BRIEF DESCRIPTION OF THE DRAWINGS

The invention will be described according to the appended drawings, in which.

PREFERRED EMBODIMENT OF THE PRESENT INVENTION

Figure 1:
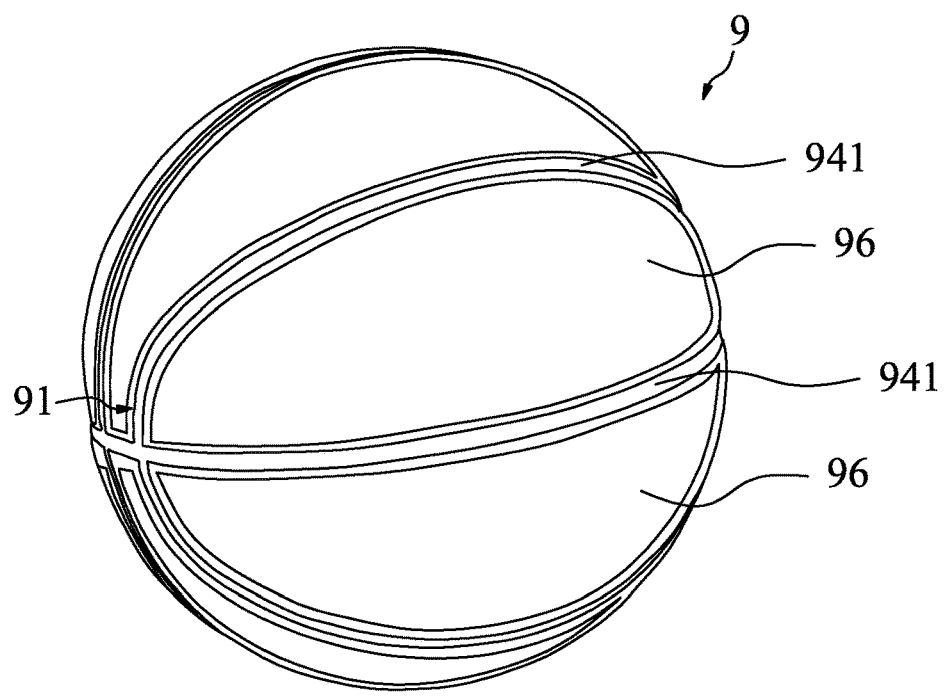
FIG. 1 illustrates a schematic perspective view of a conventional basketball.
Figure 2:
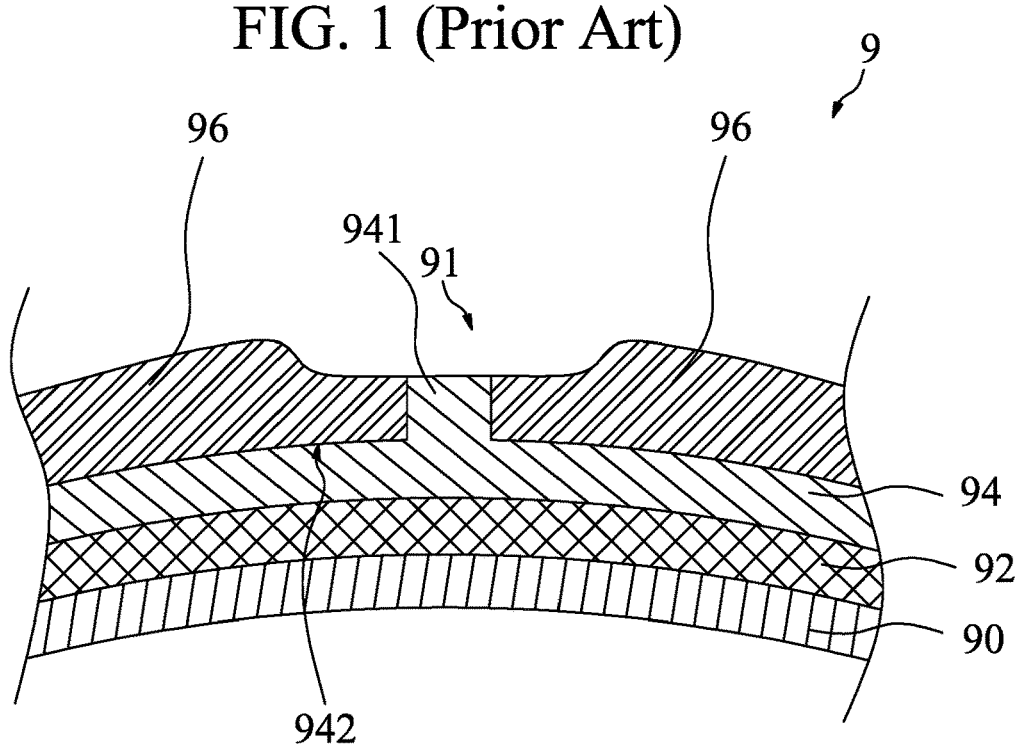
FIG. 2 illustrates a schematic partially cross-sectional view of the conventional basketball of FIG. 1.
Figure 3:
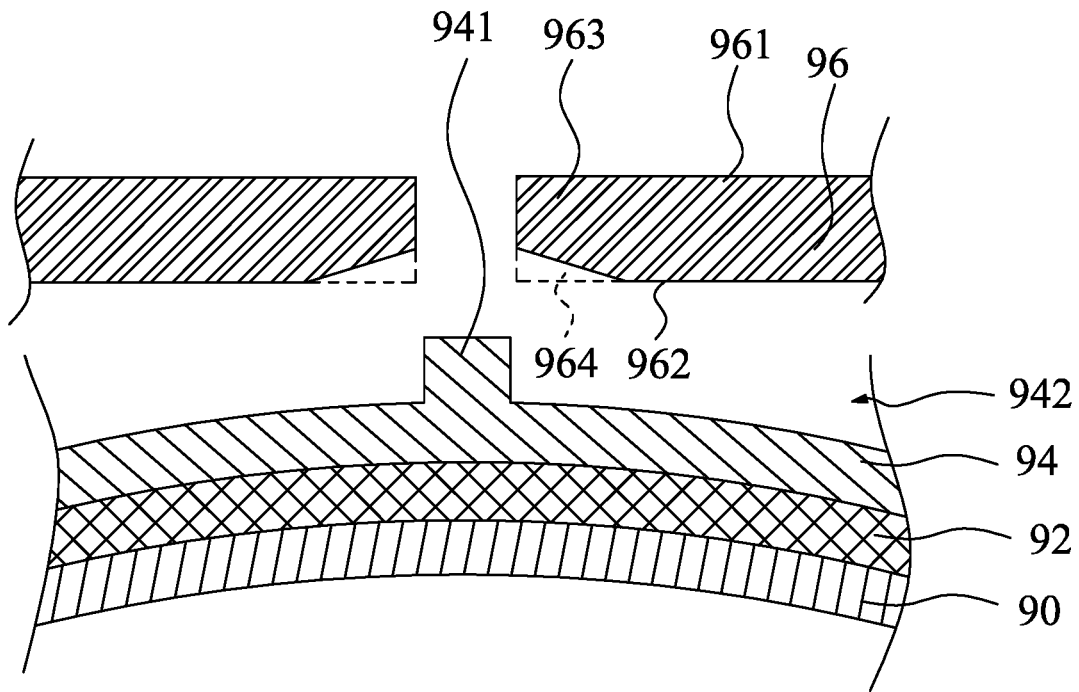
FIG. 3 illustrates a schematic view of a method for making a conventional basketball.
Figure 4:
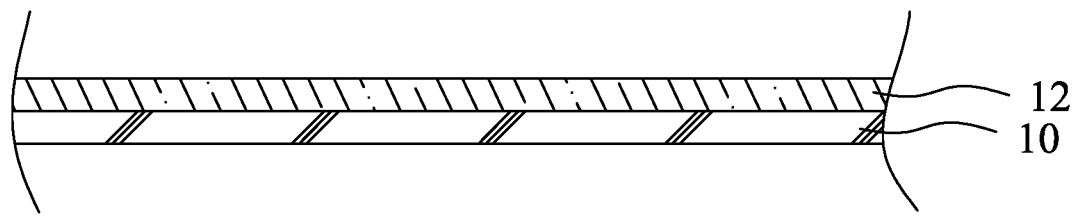
FIG. 4 to FIG. 7 illustrate one or more stages of an example of a method for making a laminated material according to some embodiments of the present invention.

Referring to FIG. 4 to FIG. 7, FIG. 4 to FIG. 7 illustrate one or more stages of an example of a method for making a laminated material 1 according to some embodiments of the present invention. Referring to FIG. 4, a second polyurethane (PU) solution is formed on a release paper 10 by means of coating, and a viscosity of the second PU solution at 30° C. is 1200 cps to 1800 cps. A PU solid content of the second PU solution is 5 wt % to 20 wt %, and is preferably 10 wt % to 15 wt %. Then, the second PU solution is dried for two minutes at a temperature of 100° C. to 120° C., to form a surface layer 12. In this embodiment, the thickness of the surface layer 12 is approximately 0.02 mm to 0.2 mm.

Figure 5:
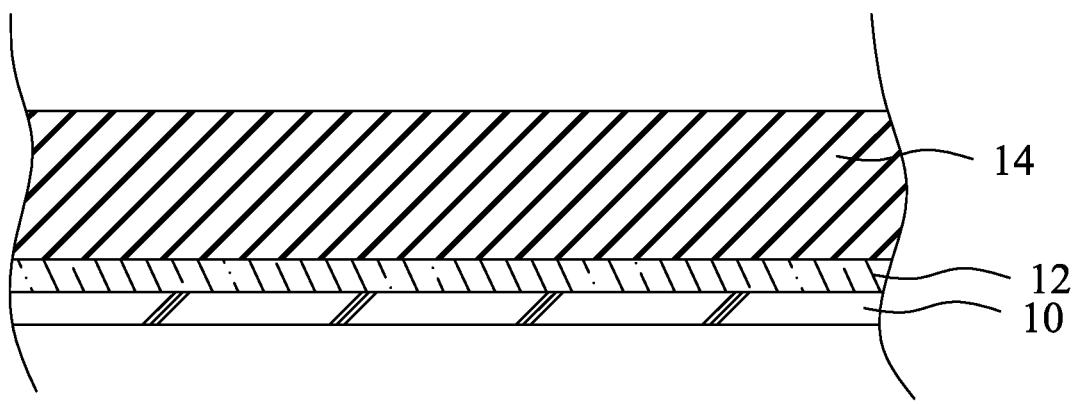

Referring to FIG. 5, a first PU solution is formed on the surface layer 12 by means of coating, and a viscosity of the first PU solution at 30° C. is 10000 cps to 30000 cps. A PU solid content of the first PU solution is greater than 70 wt %, and is preferably greater than or equal to 80 wt %. In an embodiment, the first PU solution may further include an interface agent (or a surfactant), a hardening agent, a foaming agent and a coloring agent (including e.g., colorants (or dyes) or pigments). In this embodiment, the first PU solution includes 80 wt % PU resins, 0.5 wt % to 1 wt % interface agents, 4 wt % to 6 wt % hardening agents, 2 wt % to 5 wt % foaming agents and 2 wt % to 5 wt % coloring agents. In addition, before being coated on the surface layer 12, the first PU solution may be stirred and subject to vacuum degassing to remove air during stirring. Then, the first PU solution is coated on the surface layer 12. Next, the first PU solution is dried for two and a half minutes to three minutes at a temperature of 150° C. to 170° C., to form a middle layer 14. In this embodiment, the middle layer 14 may be a foamed layer (with a porosity thereof is 25% to 85%, and is preferably 50% to 60%) or a non-foamed layer. That is, the foaming agents may be omitted. The thickness of the middle layer 14 is approximately 0.2 mm to 5 mm, and is preferably 2 mm to 3 mm.

Figure 6:
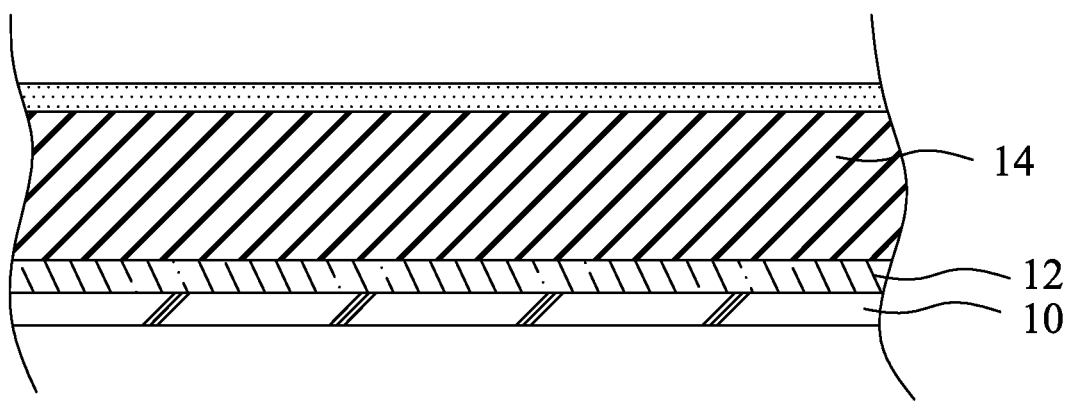

Referring to FIG. 6, an adhesive layer solution is formed on the middle layer 14 by means of coating. In this embodiment, the material of the adhesive layer solution is a PU solution, and a PU solid content thereof is approximately 50 wt %.

Figure 7:
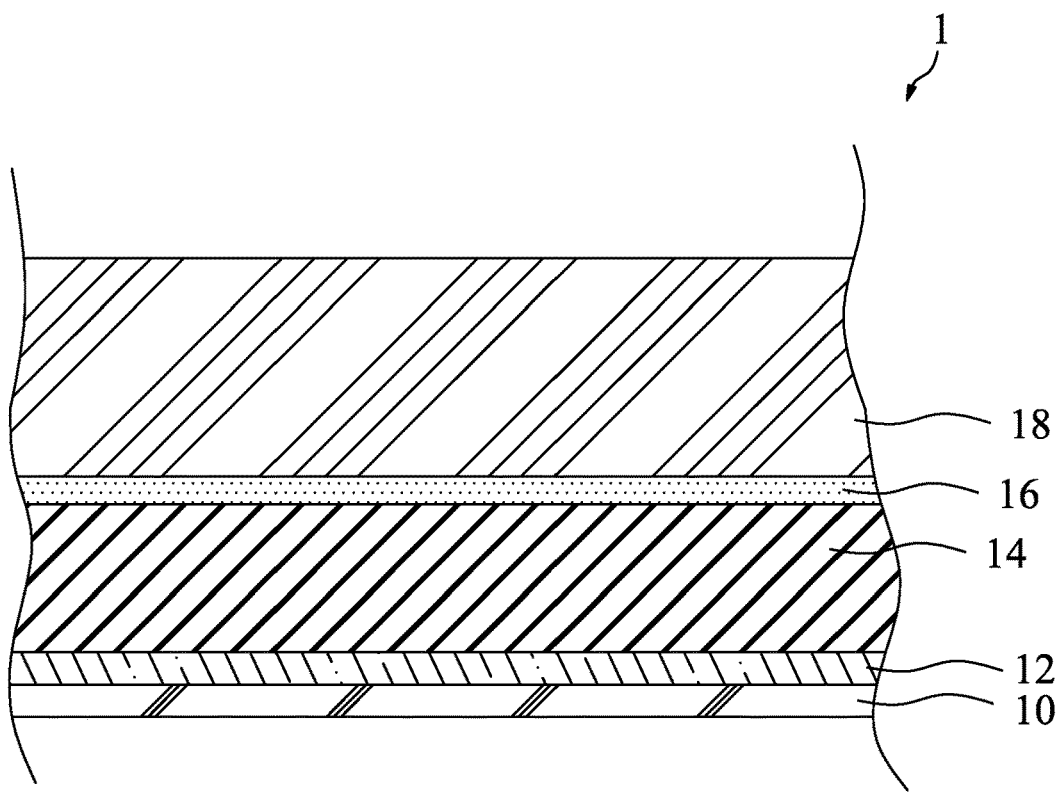

Referring to FIG. 7, a base fabric layer 18 is laminated and adhered to the adhesive layer solution. The base fabric layer 18 is a fabric such as a woven fabric, a microfiber fabric or a nonwoven fabric. In this embodiment, the thickness of the base fabric layer 18 is approximately 0.5 mm to 3 mm. Next, the adhesive layer solution is dried at a temperature of 60° C. to 140° C., to form an adhesive layer 16. Then, the release paper 10 is removed, to obtain the laminated material 1.

Figure 8:
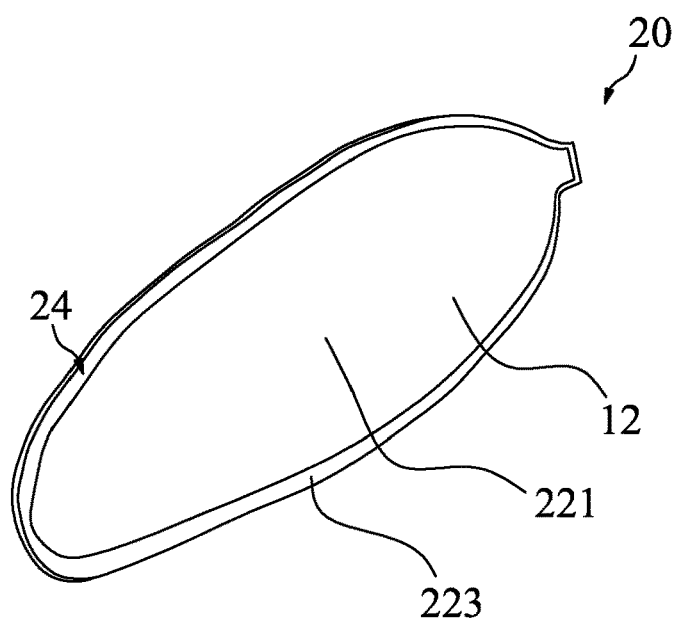
FIG. 8 illustrates a schematic perspective view of an embodiment of a cover according to the present invention.
Figure 9:
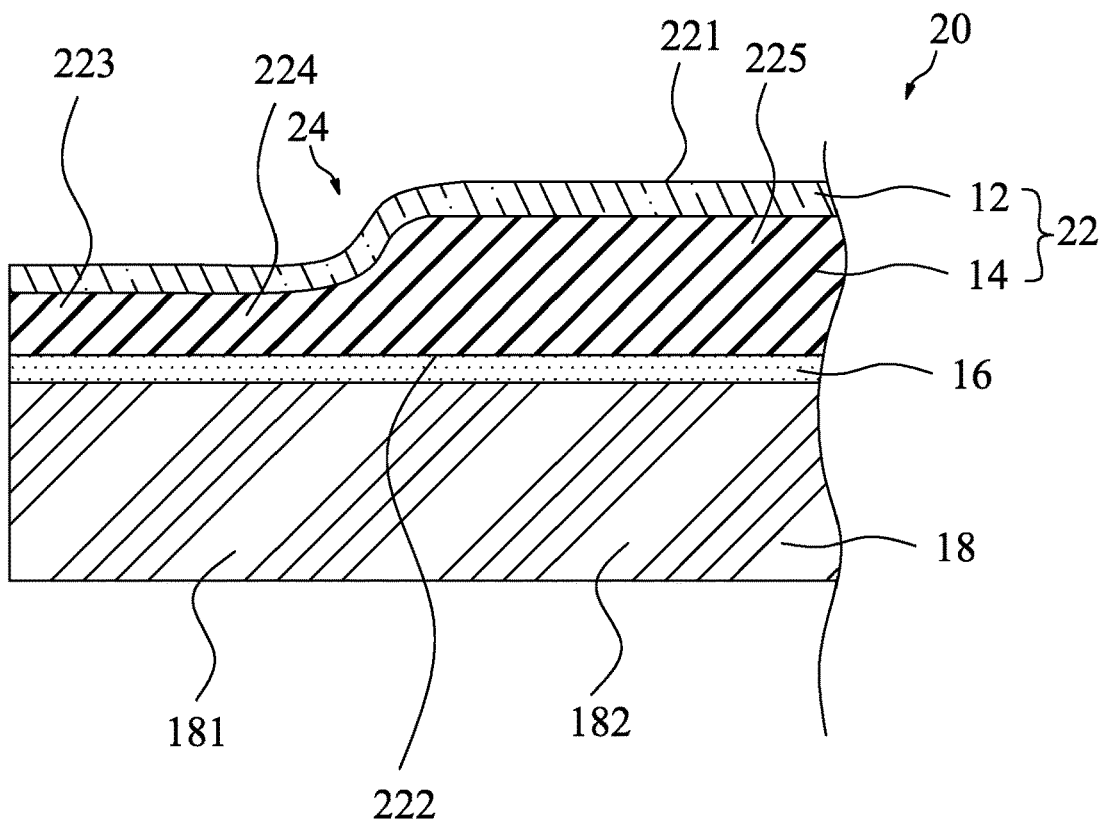
FIG. 9 illustrates a schematic partially cross-sectional view of the cover of FIG. 8.

Referring to FIG. 8, FIG. 8 illustrates a schematic perspective view of an embodiment of a cover 20 according to the present invention. Referring to FIG. 9, FIG. 9 illustrates a schematic partially cross-sectional view of the cover 20 of FIG. 8. The cover 20 is cut from the laminated material 1 (FIG. 7), and is used as an outermost layer of a ball structure. The cover 20 includes the base fabric layer 18, the adhesive layer 16 and a resin layer 22. The resin layer 22 is adhered to the base fabric layer 18 through the adhesive layer 16. In this embodiment, the resin layer 22 includes a middle layer 14 and a surface layer 12, and the middle layer 14 is located between the surface layer 12 and the base fabric layer 18. The resin layer 22 has a first surface 221, a second surface 222 and a peripheral edge 223. The first surface 221 is a top surface of the surface layer 12, and is far away from the base fabric layer 18. The second surface 222 is a bottom surface of the middle layer 14, and is attached or adhered to the adhesive layer 16. The middle layer 14 of the resin layer 22 is attached or adhered to the base fabric layer 18 through the adhesive layer 16. The peripheral edge 223 is the peripheral edge 223 of the cover 20.

In this embodiment, the peripheral edge 223 is pressurized by using radiofrequency (or high frequency) or in another way, so that the resin layer 22 has a recess portion 24 at the peripheral edge 223 of the cover 20. The recess portion 24 surrounds or encloses the cover 20.

As shown in FIG. 9, the base fabric layer 18 has a first portion 181 and a second portion 182. The first portion 181 corresponds to the recess portion 24, and the second portion 182 is far away from the recess portion 24. The thickness of the first portion 181 is substantially equal to the thickness of the second portion 182. In addition, the resin layer 22 has a first portion 224 and a second portion 225. The first portion 224 corresponds to the recess portion 24 (i.e., the peripheral edge 223), and the second portion 225 is far away from the recess portion 24. The thickness of the first portion 224 is less than the thickness of the second portion 225.

Figure 10:
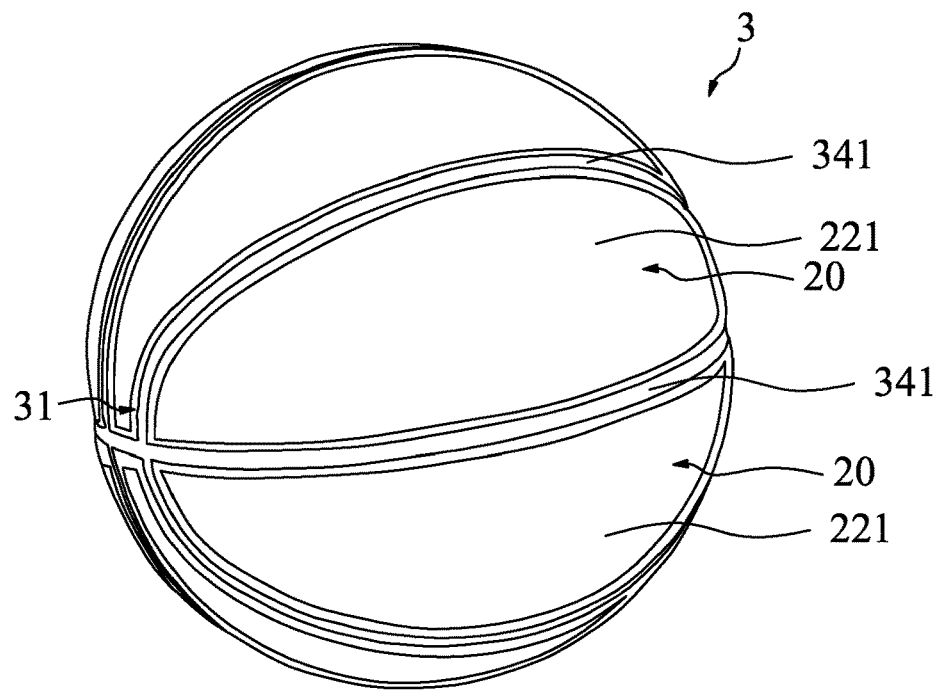
FIG. 10 illustrates a schematic perspective view of an embodiment of a ball structure according to the present invention.
Figure 11:
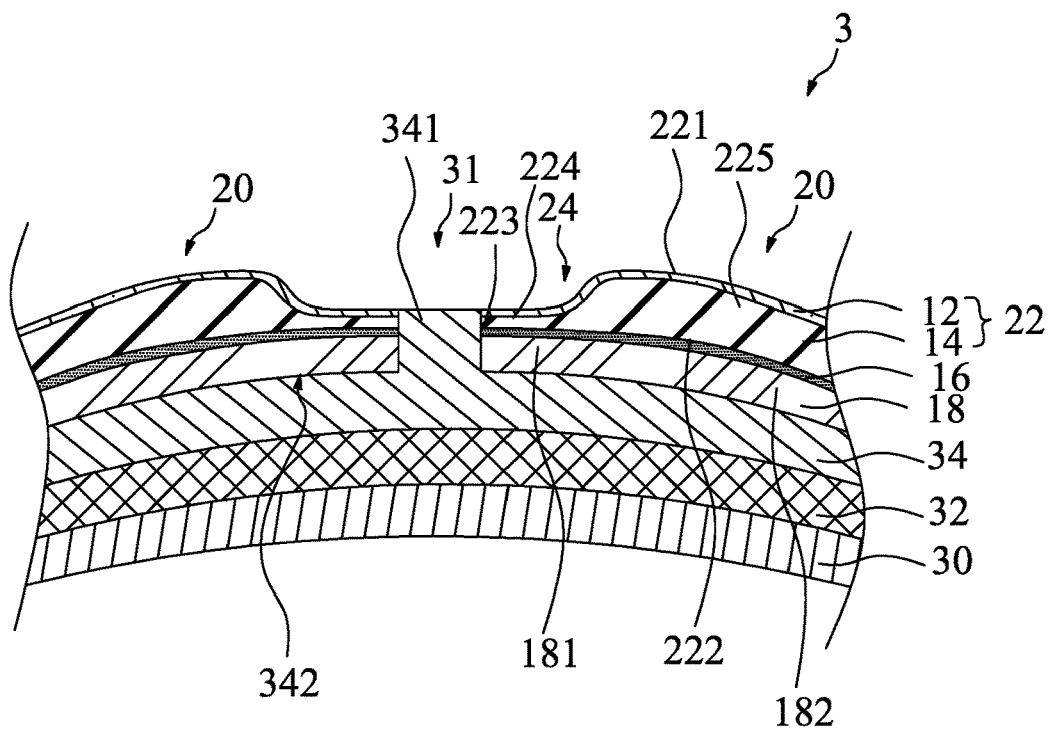
FIG. 11 illustrates a schematic partially cross-sectional view of the ball structure of FIG. 10.

Referring to FIG. 10, FIG. 10 illustrates a schematic perspective view of an embodiment of a ball structure 3 according to the present invention. Referring to FIG. 11, FIG. 11 illustrates a schematic partially cross-sectional view of the ball structure 3 of FIG. 10. In this embodiment, the ball structure 3 is a basketball. The ball structure 3 includes an inner bladder 30, a winding layer 32, a middle bladder 34 and a plurality of covers 20. The inner bladder 30 may be inflated to form a ball shape structure, and the material of the inner bladder 30 may be rubber. The winding layer 32 coats or covers the inner bladder 30. The winding layer 32 includes a plurality of yarns (or threads) that are wound on the outer surface of the inner bladder 30 to wrap the inner bladder 30 and fix the shape of the inner bladder 30, so as to prevent the inner bladder 30 from being deformed. The material of the winding layer 32 may be nylon. The middle bladder 34 coats or covers the winding layer 32, and includes a plurality of protrusion portions 341 to define a plurality of accommodating areas 342. The material of the middle bladder 34 may be rubber. The covers 20 are the covers 20 shown in FIG. 8 and FIG. 9, and there are generally eight pieces or sixteen pieces of covers 20. The covers 20 are attached or adhered to the middle bladder 34 and in the accommodating areas 342. The peripheral edges 223 of the covers 20 are attached or bonded to the protrusion portions 341. That is, the covers 20 surround the inner bladder 30.

Preferably, the thickness of the peripheral edge 223 of the cover 20 is substantially equal to the thickness of the protrusion portion 341. Thus, the first surfaces 221 of the recess portions 24 of the resin layers 22 of adjacent two covers 20 and the protrusion portion 341 therebetween define a groove (or a seam, or a channel) 31. The groove 31 can increase the friction force between the user's palm and the ball structure 3 so as to increase maneuverability or controllability. It is noted that, during the manufacturing process of the ball structure 3, the bottom surface of the cover 20 does not need to conduct the processing stage of "chamfering" (or "edge cutting", or "edge peeling"). Therefore, the base fabric layer 18 has a first portion 181 and a second portion 182. The first portion 181 corresponds to the recess portion 24, and the second portion 182 is far away from the recess portion 24. The thickness of the first portion 181 is substantially equal to the thickness of the second portion 182.

Figure 12:
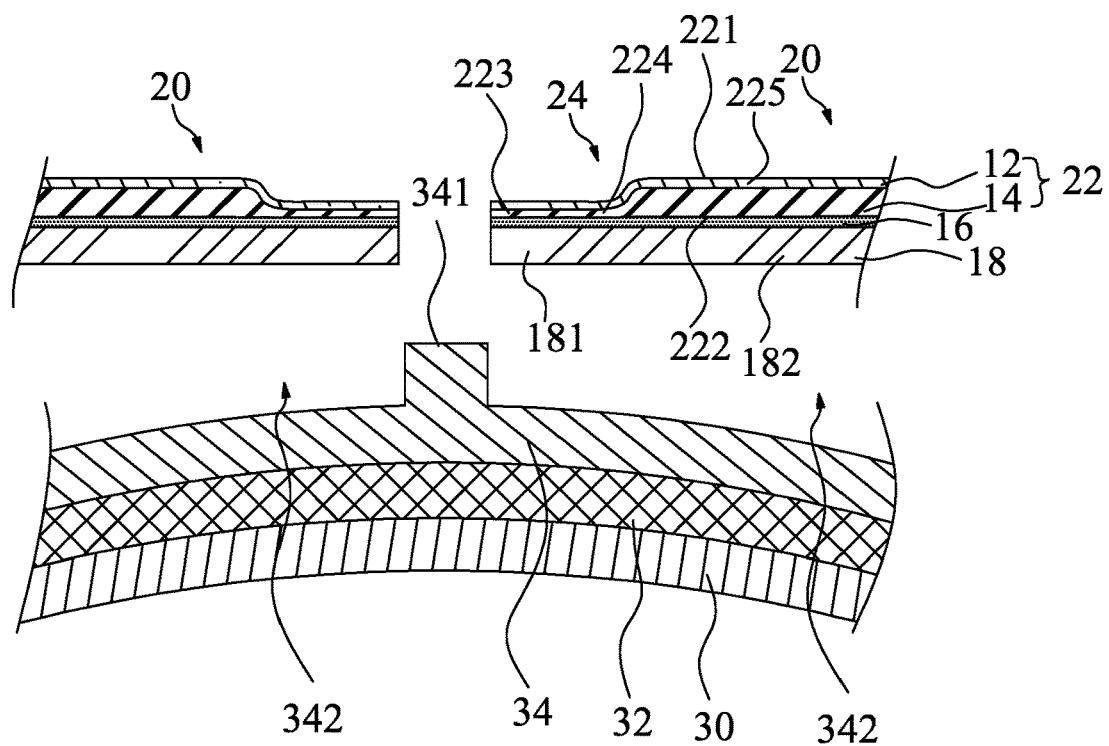
FIG. 12 illustrates one or more stages of an example of a method for making a ball structure according to some embodiments of the present invention.

Referring to FIG. 12, FIG. 12 illustrates one or more stages of an example of a method for making a ball structure 3 according to some embodiments of the present invention. The method for making the ball structure 3 is described as follows. First, the inner bladder 30 is provided. Next, the plurality of yarns (or threads) are wound on the outer surface of the inner bladder 30 to form the winding layer 32. Next, after the inner bladder 30 and the winding layer 32 are placed in a mold (not shown), the middle bladder 34 is formed on the outer surface of the winding layer 32. The middle bladder 34 includes the protrusion portions 341 to define the accommodating areas 342. Next, the covers 20 are provided, and the covers 20 are the covers 20 shown in FIG. 8 and FIG. 9. A size of each of the covers 20 is substantially equal to a size of the corresponding accommodating areas 342. Then, the base fabric layers 18 of the covers 20 are attached (or adhered) or connected to the middle bladder 34 in the accommodating areas 342 by using radiofrequency (or high frequency) or in another way. Meanwhile, the recess portions 24 of the resin layers 22 of adjacent two covers 20 and the protrusion portion 341 therebetween define the groove (or a seam, or a channel) 31, so as to make the ball structure 3 of FIG. 10 and FIG. 11.

In this embodiment, the covers 20 are directly attached (or adhered) or laminated (or pressed) to the middle bladder 34, and the conventional processing stage of "chamfering" (or "edge cutting", or "edge peeling") is not necessary. Therefore, the base fabric layer 18 can be completely retained, thus reducing processing time and manufacturing cost, and a treatment of the waste is not necessary. In addition, the method for making the ball structure 3 has advantages such as a short processing time, low labor costs, relatively high production efficiency, and good product stability.

Figure 13:
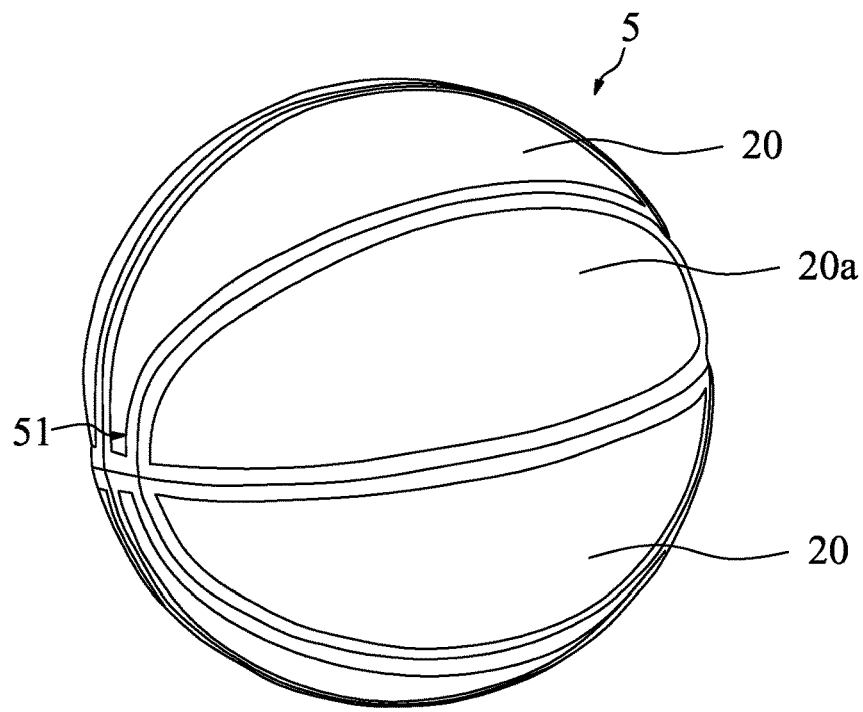
FIG. 13 illustrates a schematic perspective view of an embodiment of a ball structure according to the present invention.
Figure 14:
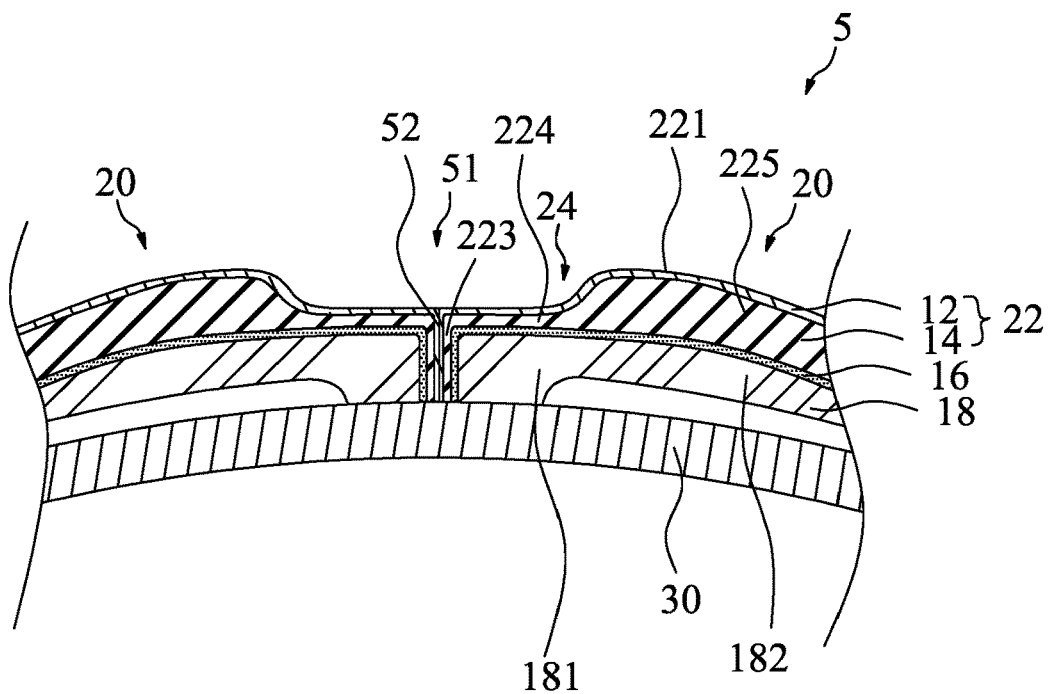
FIG. 14 illustrates a schematic partially cross-sectional view of a first part of the ball structure of FIG. 13.
Figure 15:
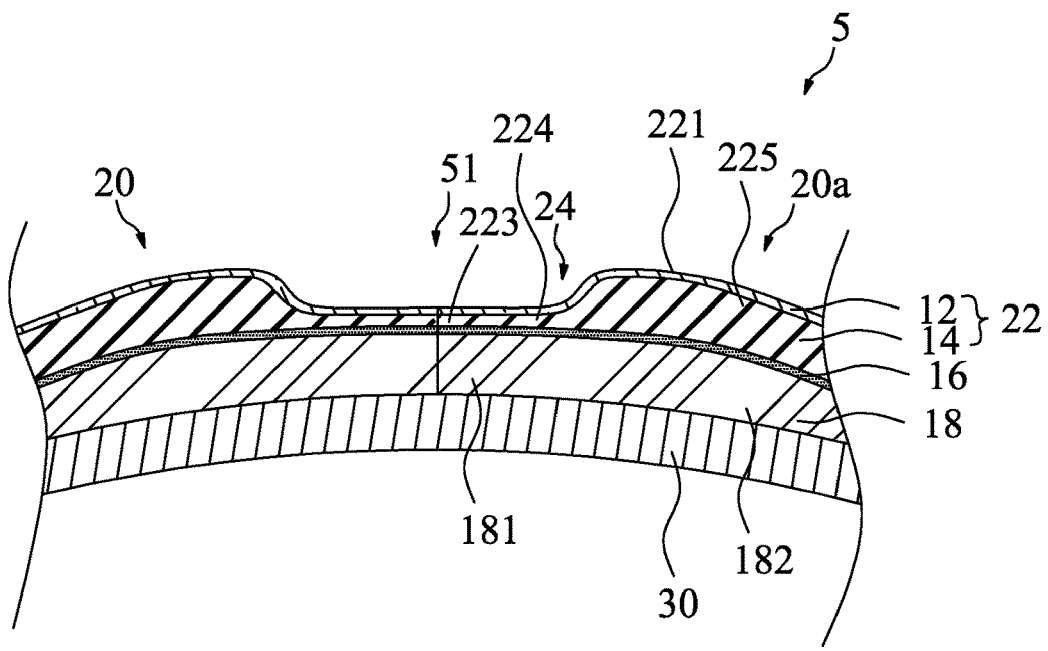
FIG. 15 illustrates a schematic partially cross-sectional view of a second part of the ball structure of FIG. 13.

Referring to FIG. 13, FIG. 13 illustrates a schematic perspective view of an embodiment of a ball structure 5 according to the present invention. Referring to FIG. 14, FIG. 14 illustrates a schematic partially cross-sectional view of a first part of the ball structure 5 of FIG. 13. Referring to FIG. 15, FIG. 15 illustrates a schematic partially cross-sectional view of a second part of the ball structure 5 of FIG. 13. In this embodiment, the ball structure 5 is a basketball. The ball structure 5 includes an inner bladder 30 and a plurality of covers 20. The inner bladder 30 may be inflated to form a ball shape structure, and the material of the inner bladder 30 may be rubber. The covers 20 surround the inner bladder 30. First surfaces 221 of the resin layers 22 of adjacent covers 20 are connected (or bonded) to each other at the peripheral edge 223 of the covers 20 to form a joint interface 52, and the joint interface 52 is substantially perpendicular to an outer surface of the inner bladder 30. Meanwhile, the first surfaces 221 of the recess portions 24 of the resin layers 22 of adjacent two covers 20 define a groove (or a seam, or a channel) 51. That is, the middle bladder 34 and the protrusion portion 341 may be omitted. In this embodiment, the lower surfaces of the covers 20 may be not connected or adhered to the inner bladder 30. That is, there may be a gap between the base fabric layers 18 of the covers 20 and the outer surface of the inner bladder 30.

As shown in FIG. 15, the ball structure 5 further includes at least one cover 20a, and a structure of the cover 20a is the same as structures of the covers 20. However, the cover 20a is directly adhered or attached to the inner bladder 30 (the cover 20a may be considered as a sealing cover). That is, the cover 20a and the covers 20 do not form the joint interface 52, and a side surface of the cover 20a faces or is in contact with side surfaces of the covers 20.

It is noted that, during the manufacturing process of the ball structure 5, the bottom surface of the cover 20 does not need to conduct the processing stage of "chamfering" (or "edge cutting", or "edge peeling"). Therefore, the base fabric layer 18 has a first portion 181 and a second portion 182. The first portion 181 corresponds to the recess portion 24, and the second portion 182 is far away from the recess portion 24. The thickness of the first portion 181 is substantially equal to the thickness of the second portion 182.

Figure 16:
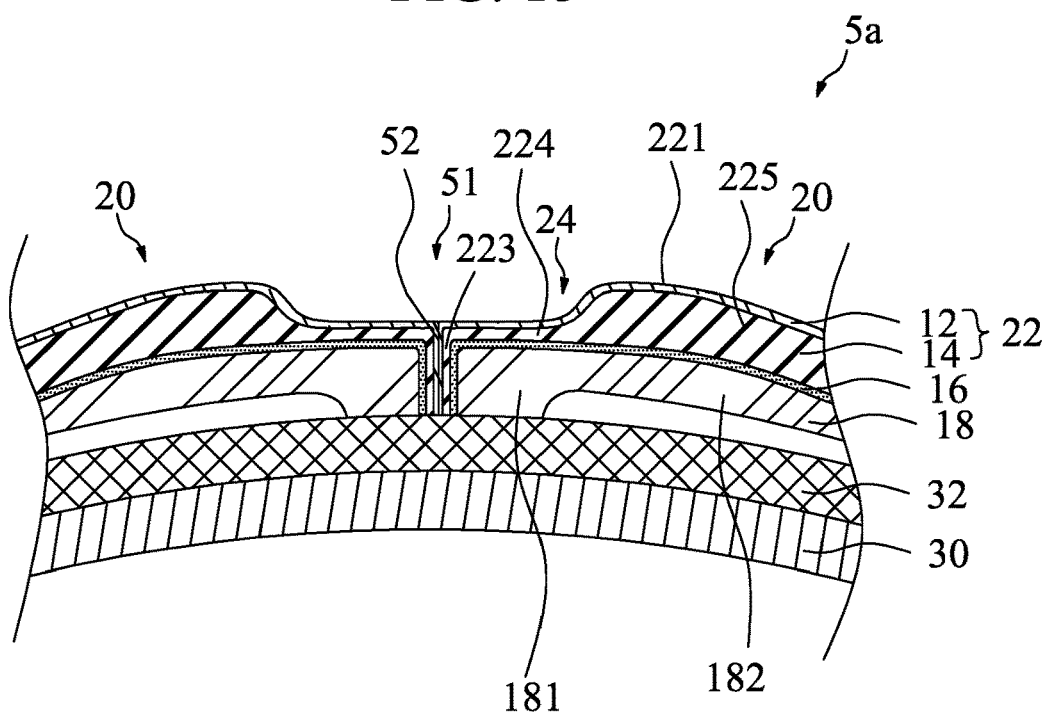
FIG. 16 illustrates a schematic partially cross-sectional view of a first part of an embodiment of a ball structure according to the present invention.
Figure 17:
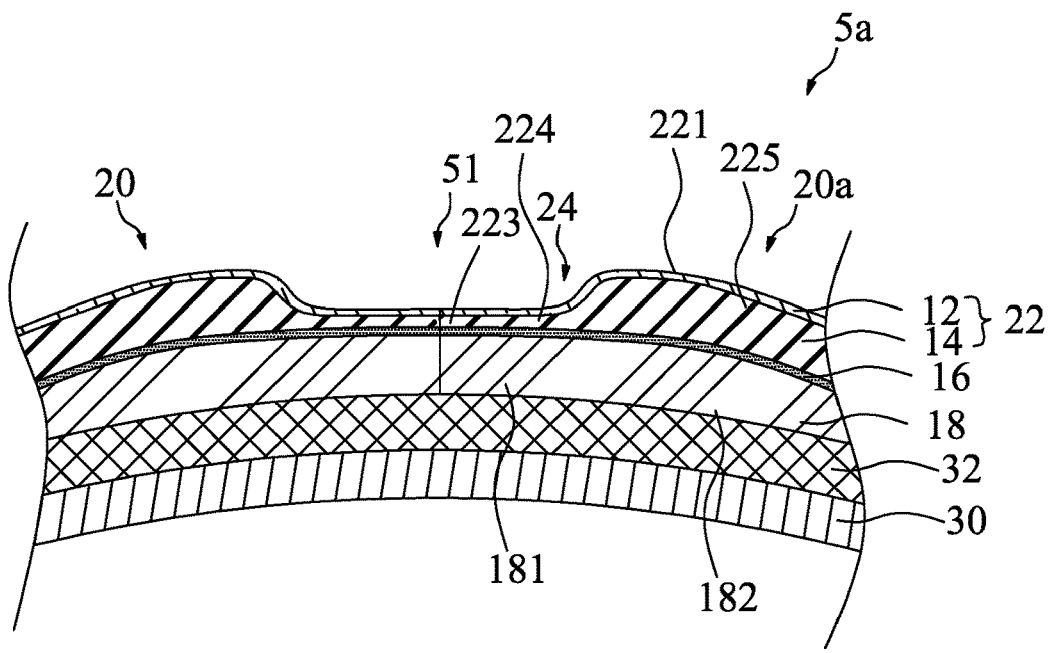
FIG. 17 illustrates a schematic partially cross-sectional view of a second part of the ball structure of FIG. 16.
Figure 18:
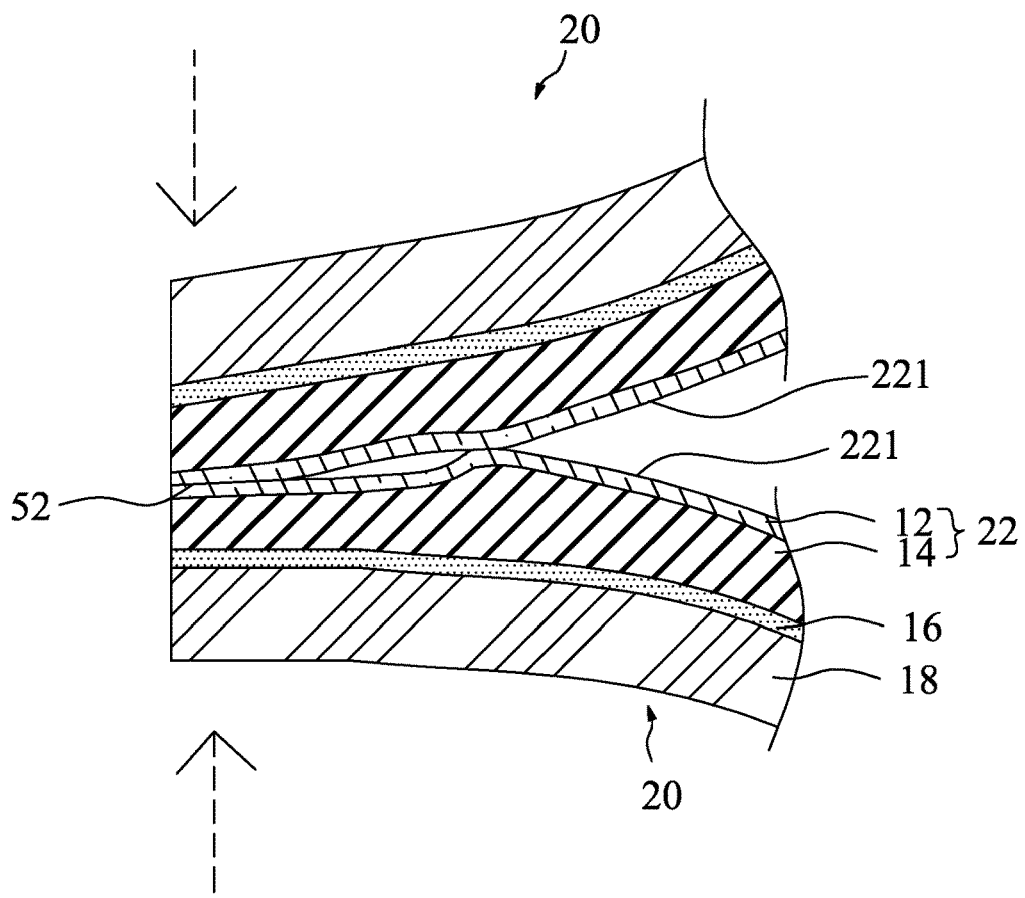
FIG. 18 to FIG. 21 illustrate one or more stages of an example of a method for making a ball structure according to some embodiments of the present invention.

Referring to FIG. 16, FIG. 16 illustrates a schematic partially cross-sectional view of a first part of an embodiment of a ball structure 5a according to the present invention. Referring to FIG. 17, FIG. 17 illustrates a schematic partially cross-sectional view of a second part of the ball structure 5a of FIG. 16. The ball structure 5a in this embodiment is substantially the same as the ball structure 5 of FIG. 13 to FIG. 15. A difference only lies in that the ball structure 5a in this embodiment further includes the winding layer 32 that is located between the inner bladder 30 and the covers 20 and 20a. Therefore, the covers 20 surround the winding layer 32. In addition, as shown in FIG. 17, the cover 20a is directly adhered or attached to the winding layer 32.

Referring to FIG. 18 to FIG. 21, FIG. 18 to FIG. 21 illustrate one or more stages of an example of a method for making a ball structure 5 according to some embodiments of the present invention. The method for making the ball structure 5 is described as follows. First, referring to FIG. 18, the plurality of covers 20 are provided. The covers 20 are the covers 20 shown in FIG. 8 and FIG. 9, and each cover 20 includes a base fabric layer 18 and a resin layer 22. The resin layer 22 has a recess portion 24 at the peripheral edge 223 of the cover 20, and the resin layer 22 has a first surface 221 that is far away from the base fabric layer 18. Next, two covers 20 are arranged in such a manner that the first surface 221 faces the first surface 221. Then, parts of the first surfaces 221 of the resin layers 22 at peripheral edges 223 of two adjacent covers 20 are connected, bonded or attached together (for example, by using radiofrequency (or high frequency)), to form a joint interface 52.

Figure 19:
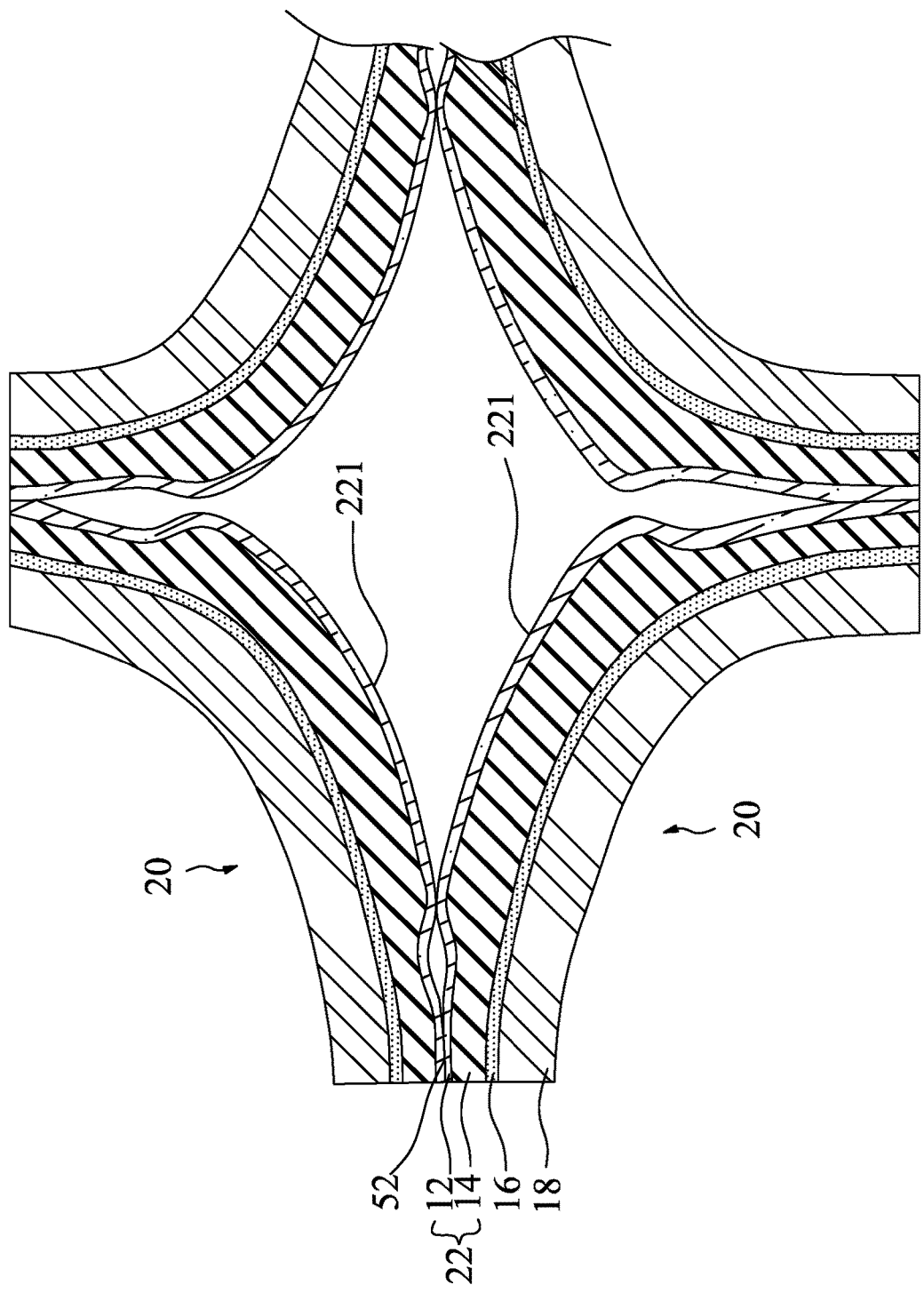

Referring to FIG. 19, another plurality of adjacent covers 20 that are planned in advance are connected or bonded together in the same manner, to form an outer skin structure 6. Meanwhile, the first surface 221 of the resin layer 22 is located inside the outer skin structure 6, and the base fabric layer 18 is located outside the outer skin structure 6.

Figure 20:
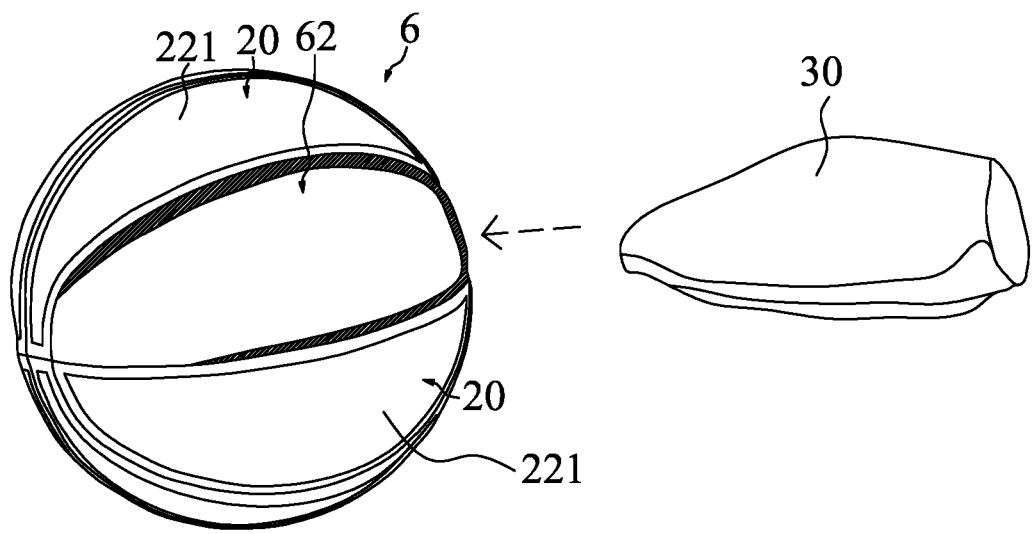
Figure 21:
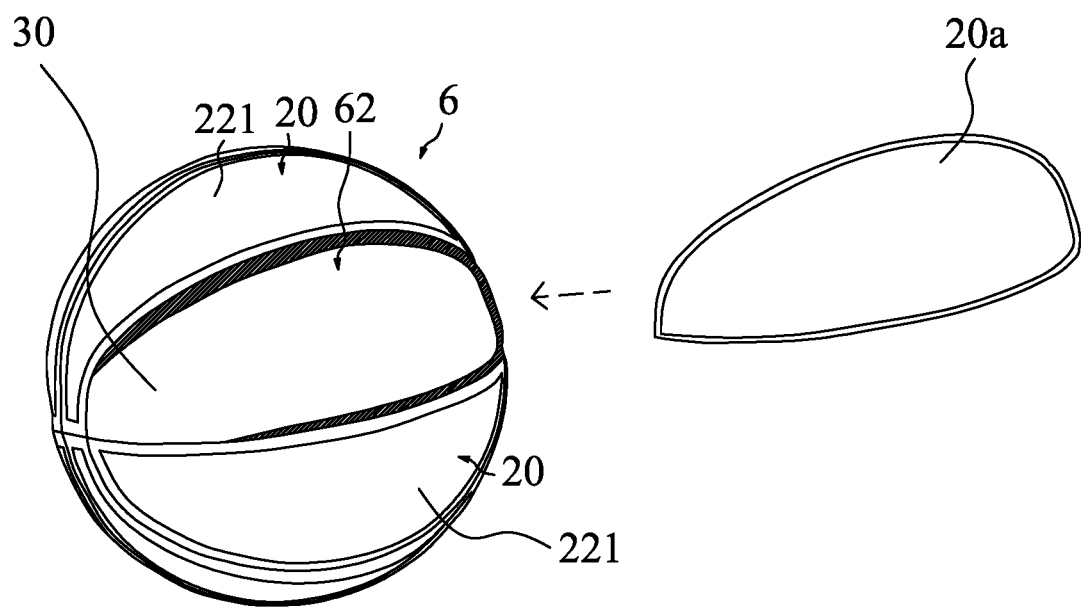

Referring to FIG. 20, the outer skin structure 6 is reversed (or turned) from the inside to the outside, so that the first surface 221 of the resin layer 22 faces outward, and the base fabric layer 18 is located inside the outer skin structure 6. Meanwhile, the outer skin structure 6 substantially forms a ball shape structure, and includes a notch 62. The size of the notch 62 is substantially the same as that of the at least one cover 20a (FIG. 21). Next, the inner bladder 30 that is not inflated is placed in the outer skin structure 6 through the notch 62.

Referring to FIG. 21, after the inner bladder 30 is inflated, the at least one cover 20a is adhered (for example, attached) to the inner bladder 30 that is exposed by the notch 62, to make the ball structure 5 shown in FIG. 13 to FIG. 15. In another embodiment, the inner bladder 30 placed in FIG. 20 is further coated or covered by a winding layer 32, and in FIG. 21, the at least one cover 20a is adhered to the winding layer 32 that is exposed by the notch 62, to make the ball structure 5a shown in FIG. 16 and FIG. 17.

In this embodiment, the covers 20 are directly connected to each other to form the outer skin structure 6, and the conventional processing stage of "chamfering" (or "edge cutting", or "edge peeling") is not necessary. Therefore, the base fabric layer 18 can be completely retained, thus reducing processing time and manufacturing cost, and a treatment of the waste is not necessary. In addition, the method for making the ball structure 5 and 5a has advantages such as a short processing time, low labor costs, relatively high production efficiency, and good product stability.

The above embodiments are merely for the purpose of describing the principles and effects of the present invention, but are not intended to limit the present invention. Modifications and variations can be made by a person of ordinary skill in the art of the present invention to the above embodiments without departing from the spirit of the present invention. The scope of the present invention is subject to the following claims.

What is claimed is:

1. A ball structure, comprising:
an inner bladder; and
a plurality of covers surrounding the inner bladder, wherein each of the covers comprises a base fabric layer and a resin layer, the resin layer has a recess portion at a peripheral edge of the cover, and the recess portions of adjacent covers define a groove, wherein the base fabric layer has a first portion and a second portion, the first portion of the base fabric layer corresponds to the recess portion, the second portion of the base fabric layer is far away from the recess portion, and a thickness of the first portion is substantially equal to a thickness of the second portion, wherein the resin layer further has a first portion and a second portion, the first portion of the resin layer corresponds to the recess portion, the second portion of the resin layer is far away from the recess portion, and the first portion of the resin layer has a substantially consistent thickness, wherein the resin layer of the cover includes a first surface that is far away from the base fabric layer, and the first surfaces of the resin layers of adjacent covers are connected to each other at a peripheral edge of the covers.

2. The ball structure according to claim 1, further comprising a winding layer and a middle bladder, wherein the winding layer covers the inner bladder, the middle bladder covers the winding layer and includes a plurality of protrusion portions to define a plurality of accommodating areas; the base fabric layers of the covers are attached to the middle bladder in the accommodating areas, and the recess portions of adjacent covers and the protrusion portion therebetween define the groove.

3. The ball structure according to claim 1, wherein at least one cover is attached to the inner bladder.

4. The ball structure according to claim 1, wherein each of the resin layers of the covers comprises a middle layer and a surface layer, the middle layer is formed from a first polyurethane (PU) solution, a PU solid content of the first PU solution is greater than 70 wt %, the surface layer is formed from a second polyurethane (PU) solution, a PU solid content of the second PU solution is 5 wt % to 20 wt %, and the middle layer is located between the surface layer and the base fabric layer.

\* \* \* \* \*